United States Patent [19]

Ozawa et al.

[11] 4,321,651

[45] Mar. 23, 1982

[54] ENCLOSED-TYPE ZINC-OXIDE SURGE ARRESTER

[75] Inventors: Jun Ozawa, Hitachi; Yoshi Akatsu, Tokaimura; Katsuji Shindo; Akio Mizukoshi, both of Hitachi; Seizo Nakano, Mito; Seiichi Maruyama; Shingo Shirakawa, both of Hitachi, all of Japan

[73] Assignee: Hitachi, Ltd., Tokyo, Japan

[21] Appl. No.: 116,986

[22] Filed: Jan. 30, 1980

[30] Foreign Application Priority Data

Feb. 9, 1979 [JP] Japan ................................ 54-13222

[51] Int. Cl.³ ................................................ H02H 3/22

[52] U.S. Cl. ...................................... 361/127; 338/21; 361/120

[58] Field of Search ............... 361/120, 126, 127, 130; 338/21; 174/140 CR, 144

[56] References Cited

U.S. PATENT DOCUMENTS 3,753,045 8/1973 Osmundsen et al. ............... 361/120
4,234,902 11/1980 Fujiwara et al. .................. 361/120

FOREIGN PATENT DOCUMENTS 479014 11/1951 Canada ............................... 361/130
53-32055 9/1978 Japan .
53-160624 12/1978 Japan .
54-1852 1/1979 Japan .
54-8854 1/1979 Japan .

OTHER PUBLICATIONS

"Development of Zinc-Oxide Non-Linear Resistors and Their Applications to Gaplen Surge Arresters", Kobayashi et al., IEEE PES Summer Meeting, Jul. 17-22, 1977.

"Reliability and Applications of Metal Oxide Surge Arresters for Power Systems", Tominaga et al., IEEE Transactions on Power Apparatus and Systems, vol. PAS-98, No. 3, May/Jun. 1979.

*Primary Examiner*—Harry E. Moose, Jr.
*Attorney, Agent, or Firm*—Craig and Antonelli

[57] ABSTRACT

In an enclosed-type zinc-oxide surge arrester with a grounded tank filled with an insulating medium, and a non-linear resistor assemblage which is connected at one end to a high voltage conductor and at the other end to the ground potential portion within the grounded tank, two or more ring-like shield means such as shield rings are disposed on the high voltage conductor side of the non-linear resistor assemblage at given distances. The use of the ring-like shield means makes more uniform the voltages shared by the respective non-linear resistors. The ring-like shield means may be formed with the configuration and diameter, and the number of them used being properly selected.

9 Claims, 10 Drawing Figures

ENCLOSED-TYPE ZINC-OXIDE SURGE ARRESTER

The invention relates to an enclosed-type zinc-oxide surge arrester without series gaps in which non-linear resistors containing zinc-oxide as the principal constituent are multilayered within a tank.

General surge arresters have used SiC as the arrester elements. Recently, arrester elements with good non-linearity have been developed each of which is formed by adding a trace of materials such as $Bi_2O_3$, CoO, MnO, $Sb_2O_3$ and the like to zinc oxide as the principal constituent, mixing those materials, moulding those materials in a given shape, and then sintering the materials shaped at high temperature of 1000° C. or above. By using the arrester elements, a surge arrester without series gaps, called a gapless surge arrester, has been developed.

In the gapless surge arrester, a plurality of arrester elements are stacked within a grounded tank filled with $SF_6$ gas and the stacked arrester elements are connected at one end to a main circuit conductor and coupled at the other end with the ground potential portion. The dielectric constant of each non-linear resistor is high, e.g. 1000 to 2000 in the gapless surge arrester. Since those elements are influenced by the tank, the voltages shared by the respective arrester elements are not equal; the arrester elements on the main circuit conductor side have higher voltages applied thereto than the remaining ones. The uneven voltage distribution over the arrester elements is due to the stray capacity straying between the arrester elements and the grounded tank. The uneven potential distribution shortens the life time of the arrester elements subjected to the higher voltages shared.

Accordingly, an object of the invention is to provide an enclosed-type zinc-oxide surge arrester with a grounded tank to make uniform the shared voltages constantly applied to the respective arrester elements.

Another object of the invention is to provide an enclosed-type zinc-oxide surge arrester with a grounded tank, which has a control means capable of easily controlling a potential distribution over the arrester elements.

An enclosed-type zinc-oxide surge arrester with a grounded tank according to the invention is provided with two or more ring-like shield means, for instance, shield rings, disposed on the main circuit conductor side of the arrester elements at given intervals, whereby the respective voltages shared by arrester elements are made uniform. The interval between the adjacent ring-like shield means is so selected as to form at least one equipotential surface extending to the arrester elements through both the ring-like shield means. The ring-like shield means may be formed by variously and properly changing the shape and diameter of the ring-like shield means, the number of the ring-like shield means used, or the like.

Other objects, features and advantages of the present invention will become apparent from the following description of preferred embodiments thereof taken in connection with the accompanying drawings, in which.

Figure 1:
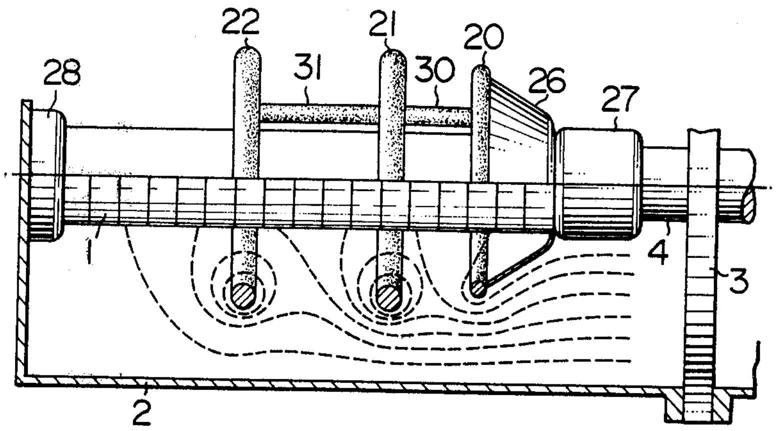
FIG. 1 shows a partially cross sectional view of an enclosed type zinc-oxide surge arrester which is an embodiment of the invention.

In FIG. 1 illustrating in partial cross section an enclosed-type zinc-oxide surge arrester, a grounded tank 2 hermetically filled with medium with good insulation such as $SF_6$ gas is sealed by an insulating spacer 3 at the opening disposed on the connection side. Disposed within the grounded tank is a non-linear resistor assemblage 1 comprising an assemblage of arrester elements of different resistance fixed at one end to the grounded tank 2 and at the other end to a high voltage conductor 4. The connecting portions at both ends of the non-linear resistor assemblage 1 as viewed in the axial direction are enclosed by shield tubes 27 and 28 for deconcentrating or unifying electric field distribution respectively.

An umbrella-shaped shield means 26 is fixed on the high voltage side of the non-linear resistor assemblage 1, with the free end of the shield means 26 on which a shield ring 20 as a ring-like member is integrally mounted. In this instance, the umbrella-shaped shield means 26 is shaped like a receptacle with a continuous side wall around its entire periphery. As another example, the means 26 may be comprised of a plurality of shield rings closely disposed. In this case, however, equipotential surfaces continuous to the equipotential surfaces of the non-linear resistor assemblage 1 through such shield rings are not formed and must be avoided, as shown in the figure.

Disposed between both ends of the non-linear resistor assemblage 1 as viewed in its axial direction are two ring-like shields such as shield rings 21 and 22 further surrounding the assemblage 1. Those shield rings 21 and 22 are fixed in a supporting manner to a high voltage conductor 4 through connecting conductors 30 and 31, while being kept at substantially the same potential as that of the high voltage conductor 4. It is notable here that the features of the invention reside in the distances or intervals among shield rings 20, 21 and 22, and the arrangement and shape of the connecting members 30 and 31. To be more specific, those components are so arranged and shaped that the equipotential lines, as depicted by dotted lines in the figure, passing through the respective rings are continuous to the equipotential surfaces of the non-linear resistor assemblage 1. With this arrangement, at least two shield rings axially disposed between both ends of the non-linear resistor assemblage 1 are separately arranged at given intervals. With respect to the connecting conductors 30 and 31, the peripheral widths and the number of them are so selected as to satisfy the above-mentioned requirement to form the equipotential lines (parts of the equipotential surfaces) in the respective shield rings. Accordingly, those shield rings each may take the form of a rod, a belt, a lead wire or the like. In fixedly positioning the shield rings 21 and 22 by the connecting conductors 30 and 31, if the above-mentioned requirement cannot be satisfied, the connecting conductors 30 and 31 are used at least as electrical connecting members and a dielectric member is additionally used for mechanically supporting them.

It is preferable to fix the respective shield rings 21 and 22 to the high voltage conductor 4 in a supporting manner, in order to reform a potential distribution along the length of the non-linear resistor assemblage 1. Specifically, when the potentials of the shield rings 21 and 22 are set to be substantially equal to that of the high voltage conductor 4, the shield ring 22 perhaps is subjected to the most rigorous conditions of electrical field and insulation. The shield ring 22 is fixed to the same potential portion of the high voltage conductor 4, through the connecting conductor 31. For this, there is no need for inserting an insulating supporting member between the shield ring 22 and the grounded tank 2 requiring electrical insulation. Therefore, it is possible to place the shield ring 22 close to the grounded tank 2 by taking advantage of the excellent insulating characteristics of $SF_6$ gas. This enables the shield ring 22 to be located at the best position to adjust the potential distribution along the length of the non-linear resistor assemblage 1. In order to weaken the surface electric field of the shield ring 22, all that is necessary is to increase the diameter of the shield ring 22, i.e. the width thereof extending in the axial direction of the non-linear resistor assemblage 1.

Figure 2:
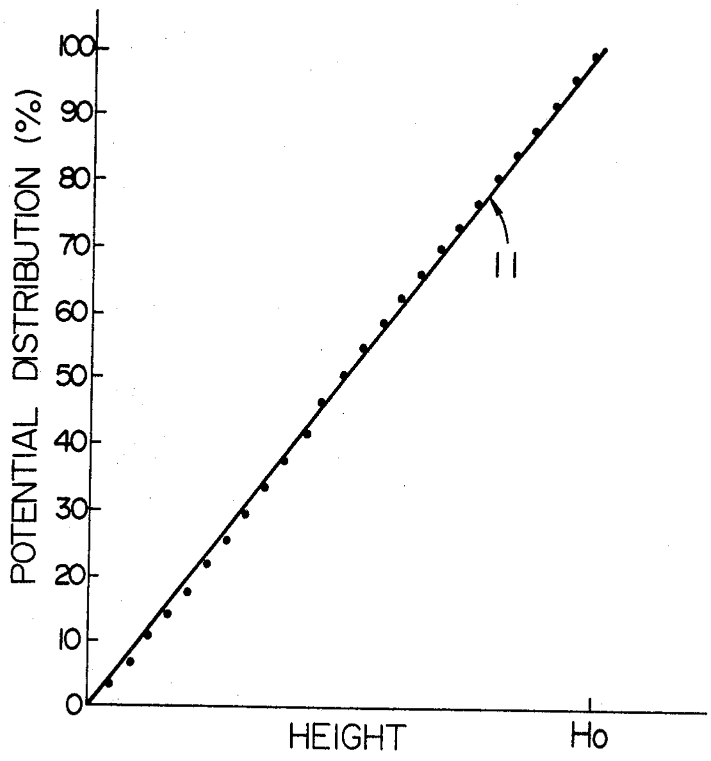
FIG. 2 shows a characteristic diagram illustrating a potential distribution afforded by the surge arrester shown in FIG. 1.

With such an arrangement, the voltages applied to the respective resistors of the non-linear resistor assemblage 1 are almost uniform, as seen from the potential distribution indicated by dots in FIG. 2. This may also be anticipated from the equipotential lines depicted by dotted lines in FIG. 1. A straight line 11 shown in FIG. 2 indicates a uniform potential distribution straight line. In FIG. 2, the axis of ordinate represents a potential distribution by % while the axis of abscissa represents a height H from the ground potential side end of the non-linear resistor assemblage 1, and the total height of the non-linear resistor assemblage 1 is represented by $H_o$.

Figure 3:
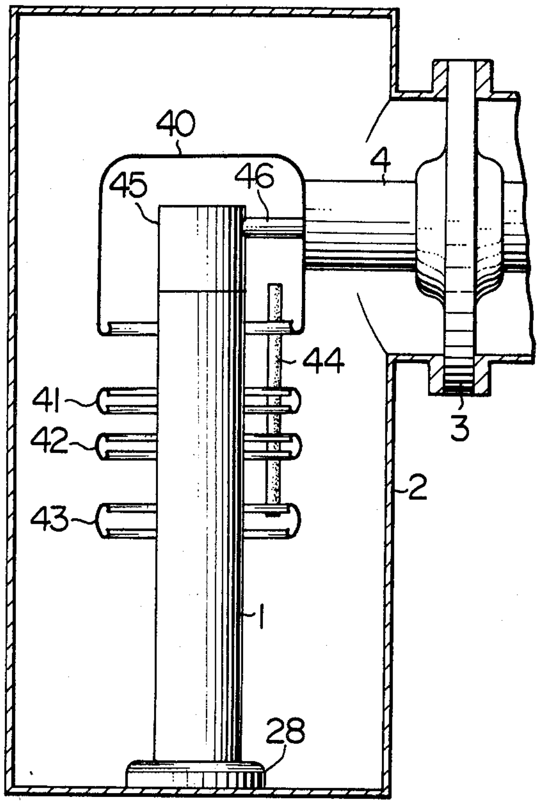
FIG. 3 shows a longitudinal, elevational view of the enclosed-type zinc-oxide surge arrester which is another embodiment according to the invention.

The embodiment shown in FIG. 1 has other additional features. The first feature is that the diameters of the shield rings 21 and 22 are larger, compared to that of the shield ring 20. This feature is advantageous for the shield ring 22 to be disposed close to the ground potential portion, in the insulating point of view. In particular, the shield ring 22 is located closer to the ground potential side of the non-linear resistor assemblage 1, with respect to the midpoint of the axial length of the non-linear resistor assemblage 1. Accordingly, the electric field easing action by the diameter of it and the excellent insulation of the $SF_6$ gas and the like may be utilized. The second feature is that the diameter of the shield ring 20 is selected to be smaller than those of the remaining shield rings. This feature is effective in improving the potential distribution on the high potential side of the non-linear resistor assemblage 1. The shield ring 22 with a large diameter is effective in improving the potential distribution on the ground potential side of the non-linear resistor assemblage 1. The third feature is that, when the number of the shield rings located between both ends of the non-linear resistor assemblage 1 in the axial direction thereof is three or more, the distances from the high voltage side end of the assemblage 1 to the first and second shield rings are smaller than the distance between the second and third shield rings 21 and 22. It was experimentally confirmed that the third feature well reforms the potential distribution on the ground potential side of the non-linear resistor assemblage 1. In the figure, the shield rings 20, 21 and 22 are illustrated with the continuous or solid cross section; however, each shield ring may be a hollow ring with a circle, a C-shape or an elliptical shape in cross section. The shield ring 20 may be replaced by a skirt-like ring shield formed by folding the free end of the umbrella-like shield means 26. An example of the surge arrester using the skirt-like ring shield is illustrated in FIG. 3. The example in the figure is provided with a cap-like shield 40 covering the high voltage side portion of the non-linear resistor assemblage 1 and slightly extending at the lower end beyond the high voltage end of the non-linear resistor assemblage 1. Ring-like shields 41, 42, 43 with C-shaped cross sections surround the outer periphery of the non-linear resistor assemblage 1 at given distances thereamong. The cap-like shield 40, and the ring-like shields 41, 42 and 43 are separated with such distances as to form the equipotential surfaces continuously extending to the equipotential surfaces of the non-linear resistor assemblage 1 through those shields 41, 42 and 43. Those shields 40 to 43 are coupled with each other by a rod-like connecting conductor 44. The cap-like shield 40 is fixed to a high voltage conductor 4 or a connecting portion 45. The high voltage conductor 4 is electrically connected with the connecting portion 45 through a conductor 46. Such a cap-like shield 40 has the actions of the umbrella-like shield means 26, the shield ring 20, and the shield tube 27 shown in FIG. 1. The potential distribution along the length of the non-linear resistor assemblage 1 may be improved to such a degree as in the case of FIG. 1.

If a plurality of shield rings are provided between the end surface of the high voltage side of the non-linear resistor assemblage 1 and the end of the ground side thereof, the lower ends of the shield ring 20 in FIG. 1 and the tubular shield 40 in FIG. 3 may be located closer to the high voltage conductor 4 than to the end surface of the high voltage side of the non-linear resistor assemblage 1.

Figure 4:
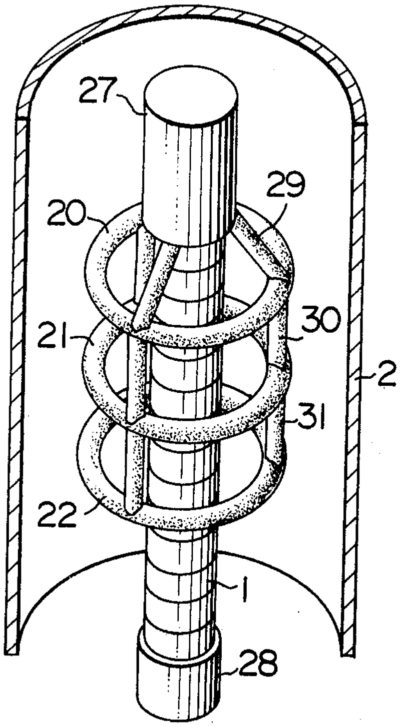
FIG. 4 shows a perspective view of an enclosed-type zinc-oxide surge arrester which is still another embodiment of the invention.

FIG. 4 shows a schematic diagram of another embodiment of the enclosed-type surge arrester according to the invention. This embodiment is the same as that of FIG. 1 in that the non-linear resistor assemblage 1 is connected at the one end to the high voltage conductor 4 and coupled at the other end with the ground potential which is equal to that of the grounded tank 2. The major difference of the embodiment from that in FIG. 1 resides in that three shield rings 20, 21 and 22 with substantially the same diameters are provided around the outer periphery of the non-linear element assemblage 1 for the purpose of controlling the potential distribution.

The shield rings 20, 21 and 22 are held at given distances in the axial direction of the non-linear resistor assemblage 1, while being kept at substantially the same potential as that of a high voltage conductor 4 (not shown).

Figure 5:
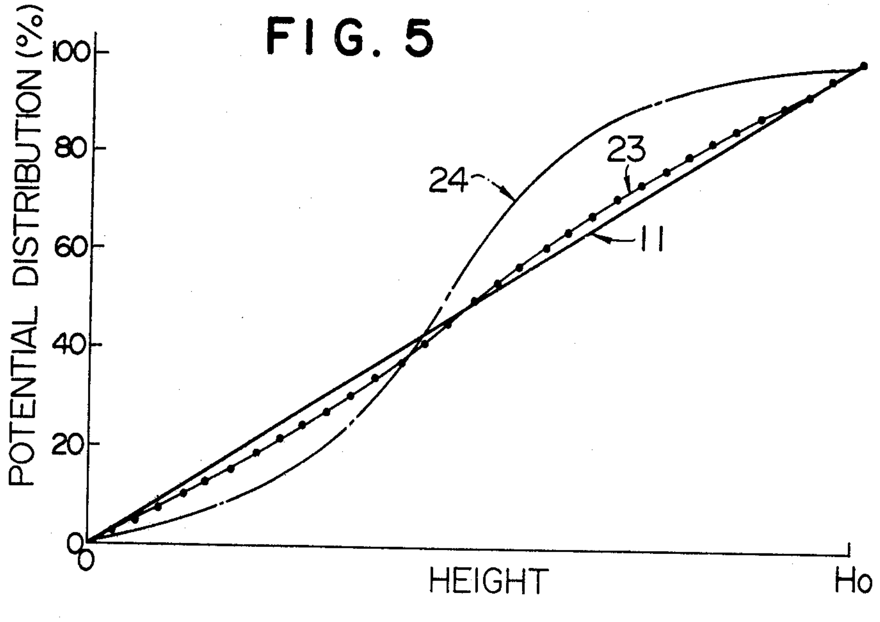
FIG. 5 shows a characteristic diagram illustrating a potential distribution afforded by the surge arrester shown in FIG. 4.

FIG. 5 shows the potential distribution curves, where the axis of ordinate represents a potential distribution by % while the axis of the abscissa represents the height H of the non-linear resistor assemblage 1 from its ground potential end, and the total height of the non-linear resistor assemblage 1 is represented by $H_o$. The potential distribution in the surge arrester thus constructed considerably approximates to a uniform distribution straight line 11, as indicated by a potential distribution curve 23 shown in FIG. 5. The uneven coefficient of the potential distribution is approximately 1.1 or less, with respect to 1.0 for the uniformity thereof.

The potential distribution formed when a single tube is used for those shield rings, is as illustrated by a curve 24 in FIG. 5. As seen from the curve 24, the voltage apportionment is severe for the non-linear resistors at the midportion of the non-linear resistor assemblage 1. The connecting conductor 30 in FIG. 4 may be an impedance means such as a capacitor or a resistor. If such an impedance means is used for the connecting conductor 30, the shield rings 21 and 22 have potentials different from that of the shield ring 20. Accordingly, use of the impedance means is effective for finely adjusting the equipotential surface. The favorable features which are brought about when the impedance means is used, are similar to those of the surge arrester shown in FIG. 3. In either case, since the shield ring 22 disposed closest to the ground potential side has no relation with the midpotential component of the non-linear resistor assemblage 1, it may be located at a position suitable mainly for improving the potential distribution by effectively using the insulating characteristics of $SF_6$ gas.

Other embodiments of the surge arrester according to the invention are illustrated in FIGS. 6 to 10 and may attain the effects similar to those by the surge arrester in FIG. 4. In those figures, the supporting member for each shield ring is not illustrated.

Figure 6:
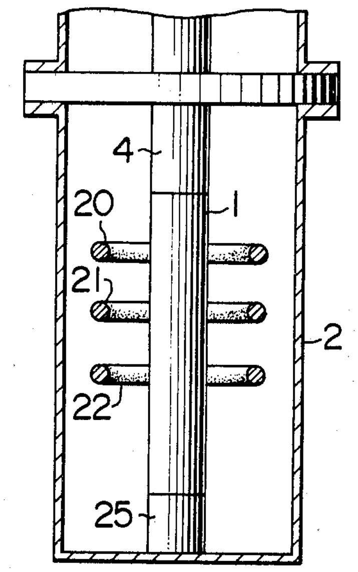

The embodiment in FIG. 6 uses a metal base 25 extending in the axial direction which is positioned at the end of the ground potential side of the non-linear resistor assemblage 1. The metal base 25 cooperates with the shield rings 20, 21 and 22 to expand a range of the potential distribution adjustment thereby to improve the potential distribution at the end of the ground potential side.

Figure 7:
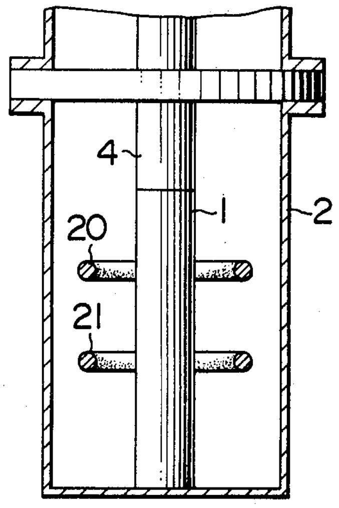

The embodiment in FIG. 7 employs two shield rings. In this embodiment, the uniformity of the potential distribution is deteriorated, when compared with the embodiment in FIG. 4, but a more preferable potential distribution may be obtained as compared with the curve 24 in FIG. 5.

Figure 8:
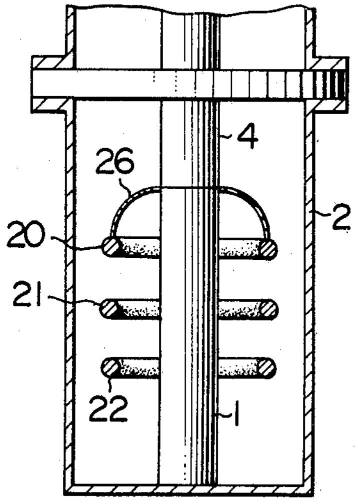

In the embodiment shown in FIG. 8, an umbrella-like shield 26 is provided between the uppermost shield ring 20 and the high voltage conductor 4, and the shields 20, 21 and 22 have the diameters which are substantially equal to each other. The embodiment with such a construction may attain the effects like those of FIG. 1. Further, the potential distribution on the high voltage conductor 4 side of the non-linear resistor assemblage 1 can be improved.

Figure 9:
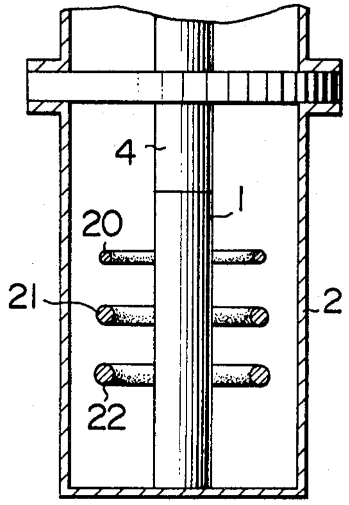

In the embodiment shown in FIG. 9, the cross sectional areas of the shield rings are larger as they are closer to the ground potential side of the non-linear resistor assemblage 1. This embodiment may ease the electric field strength at the edge of the shield ring 22. As a result, the shield ring 22 may be located at the best position to improve the potential distribution on the ground potential side of the non-linear resistor assemblage 1.

Figure 10:
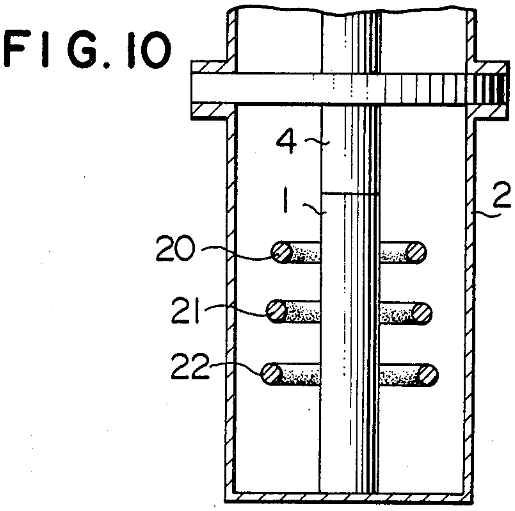
FIGS. 6 to 10 show longitudinal, elevational views of enclosed-type zinc-oxide surge arresters which are other embodiments according to the invention.

FIG. 10 shows a further embodiment of the surge arrester according to the invention. The feature of this embodiment is in that the diameters of the shield rings are larger as it approaches the ground potential side of the non-linear resistor assemblage 1. With this construction, a potential distribution between the high voltage conductor 4 side of the non-linear resistor assemblage 1 and the ground potential side is improved so as to become more desirable, compared with the surge arrester having no shield to improve the potential distribution of the non-linear resistor assemblage 1. The use of this embodiment enables the potential distribution curve in FIG. 5 to approximate to the even distribution curve 11.

The shield rings 20, 21 and 22 in the respective embodiments may take the form of a ring. However, if they each exhibit a ring-like shape for the electric field, they may be divided into a plurality of segments along the periphery thereof.

As a modification of the embodiments, auxiliary shields may additionally be provided near the ring-like shield members represented by the shield rings.

As described above, in the scheme involved in the present invention, a plurality of ring-like shields surround the outer periphery of the axial portion of the non-linear resistor assemblage 1 which is defined between both ends thereof, and are disposed therealong at given intervals. The ring-like members are electrically connected with each other by a non-ring shaped connecting conductor whereby the potential of the ring-like shields are substantially equal to that of a high voltage conductor. Therefore, the equipotential surface continuous to the equipotential surface of the non-linear resistor assemblage 1 through a space between the adjacent ring-like shields may be formed thereby the make substantially uniform the voltages applied to and born by the non-linear resistors of the assemblage 1. Additionally, the shields used to make uniform the shared voltage may be formed with the shape of a ring or the resemblance to it, with the result that the manufacturing of the surge arrester is easy and the construction thereof is simple.

What we claim is:

1. An enclosed-type zinc-oxide surge arrester comprising:

a grounded tank filled with an insulating medium;

a non-linear resistor assemblage disposed within said grounded tank and connected at one end to a high voltage conductor and at the other end to a ground potential member;

a plurality of spaced ring-like shield members disposed between the respective ends of said non-linear resistor assemblage in surrounding relationship therewith within said grounded tank;

means for fixing said ring-like shield members to the high voltage side of said non-linear resistor assemblage in a supporting manner; and means for electrically connecting said ring-like shield members so that said shield members all have substantially the same potential.

2. An enclosed-type zinc-oxide surge arrester according to claim 1, wherein said ring-like shield members are separately disposed so as to form an equipotential surface continuously extending to said non-linear resistor assemblage via the space between the adjacent ring-like shield members.

3. A enclosed-type zinc-oxide surge arrester according to claim 1, wherein the ring-like shield member disposed closest to the other end of said non-linear resistor assemblage has a greater width extending in the axial direction of the non-linear resistor assemblage than the next adjacent ring-like shield member.

4. An enclosed-type zinc-oxide surge arrester according to claim 1, wherein said ring-like shield members are so connected by said connecting means that the potential thereof is substantially equal to that of said high voltage conductor.

5. An enclosed-type zinc-oxide surge arrester according to claim 2, wherein said means for connecting said ring-like shield members is a conductor which is narrow in the peripheral direction, thereby to render the potentials of said respective ring-like shield members substantially equal.

6. An enclosed-type zinc-oxide surge arrester comprising:

a grounded tank filled with an insulating medium;

a non-linear resistor assemblage which is connected at one end to a high voltage conductor and at the other end to a ground potential portion within said grounded tank;

first ring-like shield means which is disposed closer to said high voltage conductor side between both the ends of said non-linear resistor assemblage and surrounds the outer periphery of said non-linear resistor assemblage within said grounded tank;

means for supporting said first ring-like shield means with a potential substantially equal to that of said high voltage conductor;

second ring-like shield means disposed ranging from said first ring-like shield means to the other side of said non-linear resistor assemblage at given distances, while surrounding the outer periphery of said non-linear resistor assemblage within said grounded tank;

third ring-like shield means disposed ranging from said first ring-like shield means to the other side of said non-linear resistor assemblage at given distances, while surrounding the outer periphery of said non-linear resistor assemblage within said grounded tank;

wherein the distance between said third ring-like shield means and said second ring-like shield means is longer than that between said first ring-like shield means and said second ring-like shield means;

means for fixing said first, second and third ring-like shield means to the high voltage side of said non-linear resistor assemblage in a supporting manner; and means for electrically connecting said first, second and third ring-like shield means so that they all have substantially the same potential.

7. An enclosed-type zinc-oxide surge arrester comprising:

a grounded tank filled with an insulating medium;

a non-linear resistor assemblage which is connected at one end to a high voltage conductor and at the other end to a ground potential portion within said grounded tank;

an umbrella-like shield means fixed near the connecting portion between said non-linear resistor assemblage and said high voltage conductor, thereby to render the potential thereof substantially equal to that of said high voltage conductor;

at least ring-like shield means disposed ranging from said umbrella-like shield means to the other end side of said non-linear resistor assemblage at given distances, while surrounding the outer periphery of said non-linear resistor assemblage within said grounded tank; and means for fixing said ring-like shield means to said umbrella-like shield means;

means for electrically connecting said ring-like shield means to said umbrella-like shield means so that both have substantially the same potential;

wherein one of a confronting portion between said umbrella-like shield means and said ring-like shield means and a confronting portion between said ring-like shield means is disposed between the respective ends of said non-linear resistor assemblage and the other confronting portion has a distance allowing the equipotential surface extending therethrough to said non-linear resistor assemblage.

8. An enclosed-type zinc-oxide surge arrester according to claim 7, wherein the end of said umbrella-like shield, which faces said ring-like shield, extends beyond the end of said non-linear resistor assemblage on the side of the connecting portion between said high voltage conductor and said non-linear resistor assemblage to said other end side.

9. An enclosed-type zinc-oxide surge arrester comprising:

a grounded tank filled with an insulating medium;

a non-linear resistor assemblage which is connected at one end to a high conductor and at the other end to a ground potential portion within said grounded tank;

cap-like shield means disposed so as to surround the connecting portion between said non-linear resistor assemblage and said high voltage conductor, with an end extending beyond the end of said non-linear resistor assemblage on the side of the connecting portion between said non-linear resistor assemblage and said high voltage conductor to said other side;

at least one ring-like shield means disposed with a given distance against said end of said cap-like shield means thereby to form an equipotential surface extending through the confronting portion to said non-linear resistor assemblage;

means for fixing said ring-like shield means to the high voltage side of said non-linear resistor assemblage; and means for electrically connecting said ring-like shield means to said umbrella-like shield means so that both have substantially the same potential.

* * * * *